(12) United States Patent
Onoda et al.

(10) Patent No.: US 10,579,259 B2
(45) Date of Patent: Mar. 3, 2020

(54) ELECTRONIC SCOREBOOK CREATION DEVICE, ELECTRONIC SCOREBOOK CREATION METHOD, AND COMPUTER-READABLE RECORDING MEDIUM

(71) Applicant: JVC KENWOOD Corporation, Yokohama-shi, Kanagawa (JP)

(72) Inventors: Hideaki Onoda, Yokohama (JP); Jiro Uzaki, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 917 days.

(21) Appl. No.: 14/987,857

(22) Filed: Jan. 5, 2016

(65) Prior Publication Data
US 2016/0283095 A1    Sep. 29, 2016

(30) Foreign Application Priority Data
Mar. 24, 2015    (JP) .................................. 2015-061031

(51) Int. Cl.
G06F 3/0488    (2013.01)
G06F 3/0482    (2013.01)
A63B 71/06    (2006.01)

(52) U.S. Cl.
CPC ...... G06F 3/04886 (2013.01); A63B 71/0669 (2013.01); G06F 3/0482 (2013.01)

(58) Field of Classification Search
CPC ............. G06F 3/04847; G06F 3/04886; G06F 3/04842; G06F 3/0482; A63B 71/0669
See application file for complete search history.

(56) References Cited

U.S. PATENT DOCUMENTS

| | | | | |
|---|---|---|---|---|
| 2009/0262137 A1* | 10/2009 | Walker | ................... | H04H 60/04 345/629 |
| 2010/0222143 A1* | 9/2010 | Endo | ....................... | A63F 13/10 463/30 |
| 2013/0218308 A1* | 8/2013 | Altshuler | ................ | G06F 19/00 700/91 |

FOREIGN PATENT DOCUMENTS

JP    2007-029313    2/2007

OTHER PUBLICATIONS iScore Sports Network, "iScore Tutorial v4 Part 1", (Mar. 7, 2013), <URL https://www.youtube.com/watch?v=4JPavlzDXFc/>, p. 1-45 (Year: 2013).*

(Continued)

*Primary Examiner* — Ajay M Bhatia
*Assistant Examiner* — Mong-Shune Chung
(74) *Attorney, Agent, or Firm* — Amin, Turocy & Watson, LLP

(57) ABSTRACT

An electronic scorebook creation device determines a catching fielder candidate order in which multiple fielders are arranged on the basis of operation input to a displayed field image and the positions of the fielders on the field image, and displays a catching fielder selection button group in which the fielders are arranged according to the catching fielder candidate order. The electronic scorebook creation device also determines a batted ball type candidate order in which batted ball type candidates are arranged, and displays a batted ball type selection button group in which batted ball type candidates are arranged according to the batted ball type candidate order. The electronic scorebook creation device further determines a batting result candidate order in which batting result candidates are arranged, and displays a (Continued)

batting result selection button group in which batting result candidates are arranged according to the batting result candidate order.

5 Claims, 13 Drawing Sheets

(56) References Cited

OTHER PUBLICATIONS

Fixed It! Baseball ScoreBook Mobile, "Fixed It! Baseball ScoreBook Mobile Demo", (Mar. 7, 2014), <URL https://www.youtube.com/watch?v=gn26Ou-Sw5A/>, p. 1-4 (Year: 2014).*

* cited by examiner

ELECTRONIC SCOREBOOK CREATION DEVICE, ELECTRONIC SCOREBOOK CREATION METHOD, AND COMPUTER-READABLE RECORDING MEDIUM

CROSS-REFERENCE TO RELATED APPLICATION(S)

The present application claims priority to and incorporates by reference the entire contents of Japanese Patent Application No. 2015-061031 filed in Japan on Mar. 24, 2015.

BACKGROUND OF THE INVENTION

1. Field of the Invention

The present invention relates to an electronic scorebook creation device, an electronic scorebook creation method, and a computer-readable recording medium.

2. Description of the Related Art

Baseball scorebooks have been created by scorekeepers in such a manner that scorekeepers fill in specific sheets. Scorekeepers have thus been required to learn various symbols and filling rules. In recent years, technologies for assisting creation of scorebooks with use of personal computers or the like have been developed.

Japanese Patent Application Laid-open No. 2007-29313 mentioned below, for example, discloses a technology of simplifying entries in such a manner that a runner is, or runners are, automatically made to advance to the next base or bases in response to a turn-at-bat result selected from items for selection when advancement of the runner or runners is determined definitely with respect to advancement of the batter to a base, or that advancement of a runner to a base that cannot be automatically made is input manually.

With the technology disclosed in Japanese Patent Application Laid-open No. 2007-29313, however, when a batted ball goes to the field, for example, it is necessary to wait until a fielder actually catches the batted ball before inputting an entry, which is a problem in that there is a waiting time after an actual batting until the result is confirmed and input is started.

SUMMARY OF THE INVENTION

It is an object of the present invention to at least partially solve the problems in the conventional technology.

An electronic scorebook creation device includes a display unit having a screen, an operation input unit configured to input operation on the screen, and a processor configured to create an electronic scorebook according to the operation input by the operation input unit, wherein the processor is configured to display a field image containing position information of multiple fielders on the screen, receive the operation input to the field image with use of the operation input unit, determine a catching fielder candidate order in which the fielders are arranged on a basis of positions of the fielders on the field image and the operation input with use of the operation input unit, display on the screen a catching fielder selection button group in which information on the fielders are arranged according to the catching fielder candidate order, receive a catching fielder selected and input to the catching fielder selection button group with use of the operation input unit, determine a batted ball type candidate order in which batted ball type candidates are arranged, display on the screen a batted ball type selection button group in which the batted ball type candidates are arranged in the batted ball type candidate order, receive a batted ball type selected and input to the batted ball type selection button group with use of the operation input unit, determine a batting result candidate order in which batting result candidates are arranged, display on the screen a batting result selection button group in which the batting result candidates are arranged according to the batting result candidate order, receive a batting result selected and input to the batting result selection button group with use of the operation input unit, and create an electronic scorebook on a basis of information on the received catching fielder, batted ball type, and batting result.

An electronic scorebook creation method using an electronic scorebook creation device including a display unit having a screen, an operation input unit configured to input operation on the screen, and a processor configured to create an electronic scorebook according to operation input by the operation input unit, the electronic scorebook creation method includes displaying a field image containing position information of multiple fielders on the screen, receiving the operation input to the field image with use of the operation input unit, determining a catching fielder candidate order in which the fielders are arranged on a basis of positions of the fielders on the field image and the operation input with use of the operation input unit, displaying on the screen a catching fielder selection button group in which information on the fielders are arranged according to the catching fielder candidate order, receiving a catching fielder selected and input to the catching fielder selection button group with use of the operation input unit, determining a batted ball type candidate order in which batted ball type candidates are arranged, displaying on the screen a batted ball type selection button group in which the batted ball type candidates are arranged in the batted ball type candidate order, receiving a batted ball type selected and input to the batted ball type selection button group with use of the operation input unit, determining a batting result candidate order in which batting result candidates are arranged, displaying on the screen a batting result selection button group in which the batting result candidates are arranged according to the batting result candidate order, receiving a batting result selected and input to the batting result selection button group with use of the operation input unit, and creating an electronic scorebook on a basis of information on the received catching fielder, batted ball type, and batting result.

A non-transitory computer-readable recording medium that therein stores a computer program causing an information processing device to function, the information processing device being connected to a display unit having a screen and an operation input unit configured to input operation on the screen, the information processing device being configured to create an electronic scorebook according to operation input by the operation input unit, the computer program causing the information processing device to execute displaying a field image containing position information of multiple fielders on the screen, receiving the operation input to the field image with use of the operation input unit, determining a catching fielder candidate order in which the fielders are arranged on a basis of positions of the fielders on the field image and the operation input with use of the operation input unit, displaying on the screen a catching fielder selection button group in which information on the fielders are arranged according to the catching fielder candidate order, receiving a catching fielder selected and input to the catching fielder selection button group with use of the operation input unit, determining a batted ball type candidate order in which batted ball type candidates are arranged, displaying on the screen a batted ball type selection button group in which the batted ball type candidates are arranged in the batted ball type candidate order, receiving a batted ball type selected and input to the batted ball type selection button group with use of the operation input unit, determining a batting result candidate order in which batting result candidates are arranged, displaying on the screen a batting result selection button group in which the batting result candidates are arranged according to the batting result candidate order, receiving a batting result selected and input to the batting result selection button group with use of the operation input unit, and creating an electronic scorebook on a basis of information on the received catching fielder, batted ball type, and batting result.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an electronic scorebook creation device, an electronic scorebook creation method, and a computer-readable recording medium will be described in detail below with reference to the accompanying drawings. Specific numerical values, appearance, and so on presented in the embodiments are merely examples for facilitating understanding of the present invention, and do not limit the present invention unless otherwise stated. Elements that are not directly relevant to the present invention will not be described in detail and illustrated.

First Embodiment

Figure 1:
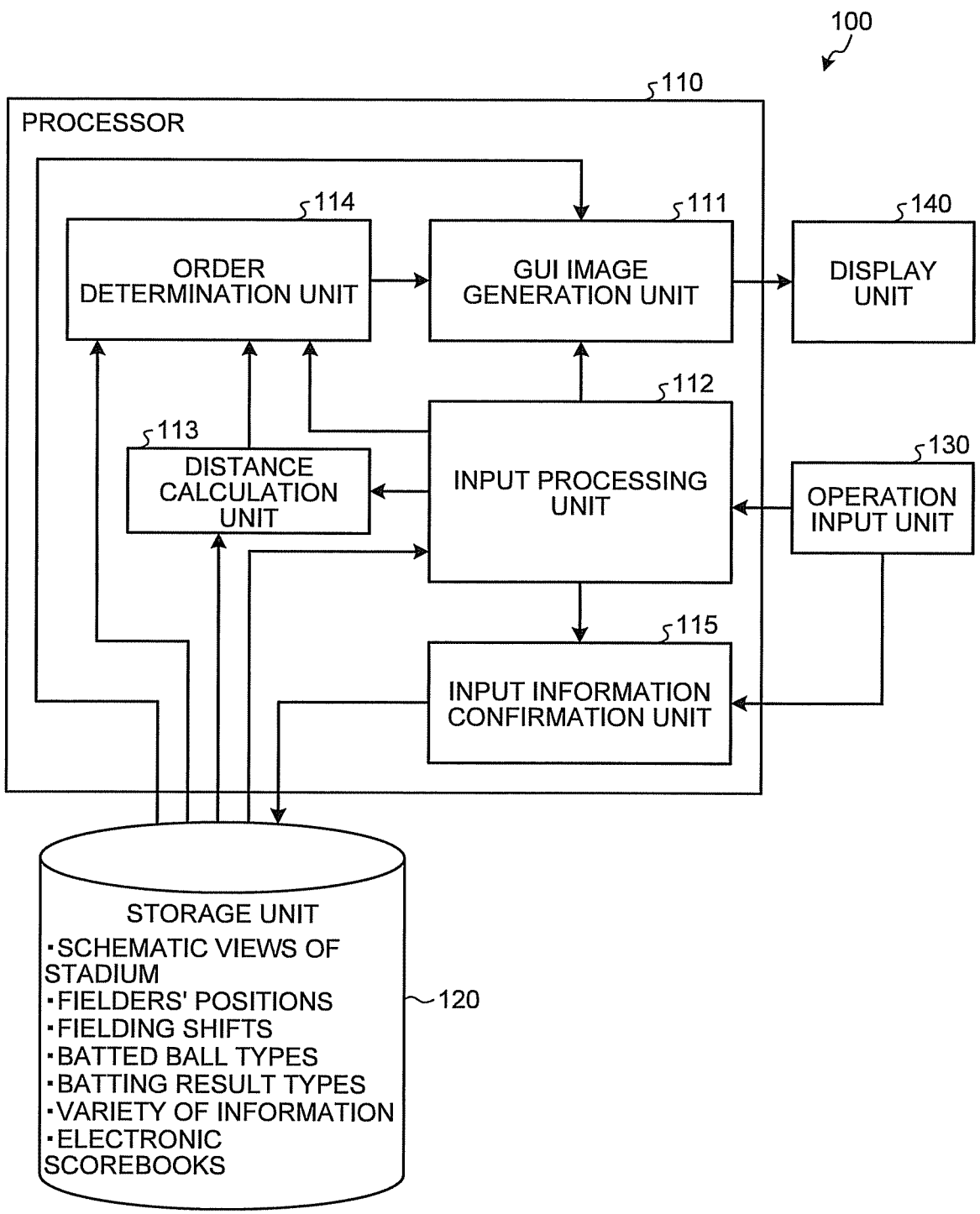
FIG. 1 is a block diagram illustrating an example schematic configuration of an electronic scorebook creation device according to a first embodiment.

FIG. 1 is a block diagram illustrating an example schematic configuration of an electronic scorebook creation device according to a first embodiment. As illustrated in FIG. 1, the electronic scorebook creation device 100 includes a processor 110, a storage unit 120, an operation input unit 130, and a display unit 140.

The processor 110 may be an information processing device such as a central processing unit (CPU) in a personal computer or the like, or an information processing device on a network that enables cloud computing. Examples of the personal computer include various personal computers such as desktop, laptop, and tablet personal computers. Alternatively, various information processing terminals such as a smart phone and a slate device may be used instead of the personal computer.

The storage unit 120 may be an internal or external storage of the personal computer, or a storage on a network such as the Internet or a local area network (LAN). The storage unit 120 stores various pieces of information such as schematic views of a stadium, ID information that is information on fielders, which will be described later, fielders' positions (field coordinates, which will be described later), fielding shifts (shift amounts from field coordinates or original positions), types of batted balls, types of batting results, various pieces of information (such as conversion equations, offsets between coordinate systems, and various associations), and electronic scorebooks. An electronic scorebook may include catching fielders, batted ball types, batting results, on-base conditions (including runners being safe or out), counts, scores, etc.

The operation input unit 130 may be a touch panel pointing device or a pointing device with a touch pad, a mouse, or the like. The operation input unit 130 may also include a physical keyboard or an electronic keyboard.

The display unit 140 may be a display mounted on a personal computer or the like. A touch panel pointing device that is the operation input unit 130 may be disposed on a display surface of the display unit 140.

Furthermore, as illustrated in FIG. 1, the processor 110 may include a graphical user interface (GUI) image generation unit 111, an input processing unit 112, a distance calculation unit 113, an order determination unit 114, and an input information confirmation unit 115.

Next, example operation of the processor 110 in creating an electronic scorebook according to the first embodiment will be described with reference to FIG. 1. In the description, some of example procedures for creating an electronic scorebook according to the first embodiment will also be described with reference to FIGS. 2 to 6 where necessary.

For creating an electronic scorebook, a schematic view of a stadium (hereinafter referred to as a field image) 10 and icons 13 of fielders placed on the field image 10 are provided to the user via the display unit 140 (see FIG. 2, for example). Note that the ID information (numbers '1' to '9', for example) displayed on each of the icons 13 of fielders may be information provided in advance so as to uniquely identify a fielding position, for example. This description presents an example in which a pitcher is represented by '1', a catcher is represented by '2', a first baseman is represented by '3', a second baseman is represented by '4', a third baseman is represented by '5', a shortstop is represented by '6', left fielder is represented by '7', a center fielder is represented by '8', and a right fielder is represented by '9'. Note that the ID information is not limited thereto, and may be replaced by information capable of identifying a fielder on the field image 10, such as the uniform number or the name of a fielder who is actually fielding.

Figure 2:
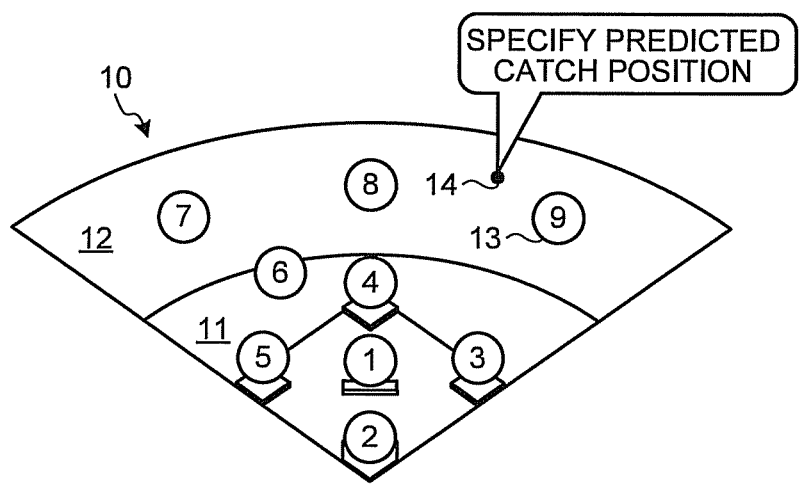
FIG. 2 is a first diagram for explaining some of example procedures for creating an electronic scorebook according to the first embodiment.

Subsequently, when a game is started and a batter in the batter's box has batted, the user predicts a fielder's catch position by actually watching the game or a video and specifies a position (predicted catch position) 14 on the field image 10 corresponding to the predicted position by using the operation input unit 130 as illustrated in FIG. 2. The predicted catch position 14 specified by the user may be an approximate catch position and may be entered before the actual catch position is determined.

The predicted catch position 14 input to the operation input unit 130 is input to the input processing unit 112. Information on the predicted catch position 14 is coordinates in a coordinate system (hereinafter referred to as a screen coordinate system) set for a screen of the display unit 140, for example. The input processing unit 112 converts coordinates (hereinafter referred to as screen coordinates) of the predicted catch position 14 in the screen coordinate system to coordinates (hereinafter referred to as field coordinates) in a coordinate system (hereinafter referred to as a field coordinate system) set for the field image 10. Information (such as conversion equations and offsets between the coordinate systems) for conversion from screen coordinates to field coordinates may be stored in advance in the storage unit 120, for example. In a case where various calculations are all carried out in the screen coordinate system, however, conversion from screen coordinates to field coordinates can be omitted. In such a case, the field coordinate system and the field coordinates in the following description are to be replaced by the screen coordinate system and the screen coordinates.

Figure 3:
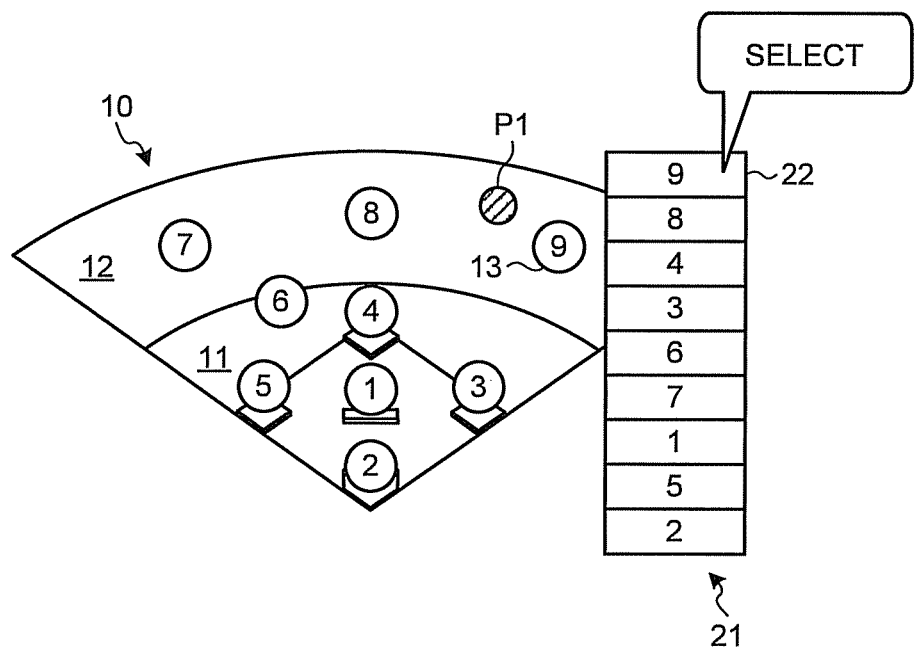
FIG. 3 is a second diagram for explaining some of example procedures for creating an electronic scorebook according to the first embodiment.

The field coordinates of the predicted catch position 14 are input to the GUI image generation unit 111. The GUI image generation unit 111 generates an image P1 depicting the predicted catch position 14 input from the operation input unit 130 for the user. The generated image P1 is displayed at the predicted catch position 14 on the field image 10 on the display unit 140 as illustrated in FIG. 3.

The field coordinates of the predicted catch position 14 are also input to the distance calculation unit 113. The distance calculation unit 113 also has field coordinates of the fielders loaded therein in advance from the storage unit 120. The distance calculation unit 113 calculates distances from the predicted catch position 14 to the respective fielders from the field coordinates of the predicted catch position 14 and the field coordinates of the fielders. The calculated distances of the respective fielders are input to the order determination unit 114.

The order determination unit 114 arranges all the fielders in descending order of possibility of catching on the basis of the input distances of the respective fielders to determine the order of catching fielder candidates. Information on the catching fielder candidate order is input to the GUI image generation unit 111 together with the ID information for identifying the fielders. The GUI image generation unit 111 generates an image of selection buttons for selecting the fielder who has caught the ball, and arranges the selection buttons according to the catching fielder candidate order. The image of the arranged selection buttons is displayed as a catching fielder selection button group 21 on the display unit 140 as illustrated in FIG. 3. In this process, the GUI image generation unit 111 displays the catching fielder selection button group 21 on the display unit 140 in such a manner that the fielder who is the most likely to catch the ball is at a position that is most easily selectable for the user. For example, in the example illustrated in FIG. 3, the right fielder '9', the center fielder '8', the second baseman '4', the first baseman '3', the shortstop '6', the left fielder '7', the pitcher the third baseman '5', and the catcher '2' are displayed in this order from the top on the basis of the distances from the predicted catch position 14. The user selects and inputs the fielder who has actually caught the ball to the displayed catching fielder selection button group 21 with use of the operation input unit 130. For example, in the example illustrated in FIG. 3, a selection button 22 of the right fielder '9' is selected and input as the fielder who has actually caught the ball. In this operation, since the distance from the predicted catch position 14 to the catching fielder selection button group 21 on the screen is short, the operation time can be shortened and input can be performed more smoothly.

Information on the selected and input catching fielder is input to the input processing unit 112. The input processing unit 112 inputs the information on the selected and input catching fielder to the GUI image generation unit 111 and to the order determination unit 114. The GUI image generation unit 111 generates an image for highlighting the selection button of the selected and input catching fielder in the catching fielder selection button group 21 that is currently displayed, for example, in order to show the catching fielder to the user. The GUI image generation unit 111 updates the selection buttons being displayed by using the generated image. For example, in the example illustrated in FIG. 4, an image for highlighting the selection button 22 of the selected right fielder '9' is generated, and used to update the selection button 22 being displayed.

Meanwhile, the order determination unit 114 arranges types of batted balls in descending order of possibility on the basis of the information on the predicted catch position 14, for example, to determine the order of batted ball type candidates. The batted ball type candidates may be read in advance from the storage unit 120, for example. In this description, four types of batted balls, which are 'fly', 'liner', 'grounder', and 'bunt' are presented as examples of the batted ball types. Association between the information on the predicted catch position 14 and the batted ball type candidate order may also be read in advance from the storage unit 120, for example. In this case, the order determination unit 114 may determine the batted ball type candidate order on the basis of the input information on the predicted catch position 14 and the association read from the storage unit 120. When the batted ball type candidate order is to be determined on the basis of combination of a plurality of pieces of information such as the predicted catch position 14 and the catching fielder, association between the combination and the batted ball type candidate order may be registered in advance in the storage unit 120. The combination of the plurality of pieces of information may be combination of two or more pieces of information selected from the predicted catch position 14 (or catch area), the catching fielder, fielders' running abilities (running speeds), identification information of the batter (or the batter's batting average or slugging percentage), the pitcher's pitch type, on-base conditions, the count, the number of outs, and the like, for example.

Figure 4:
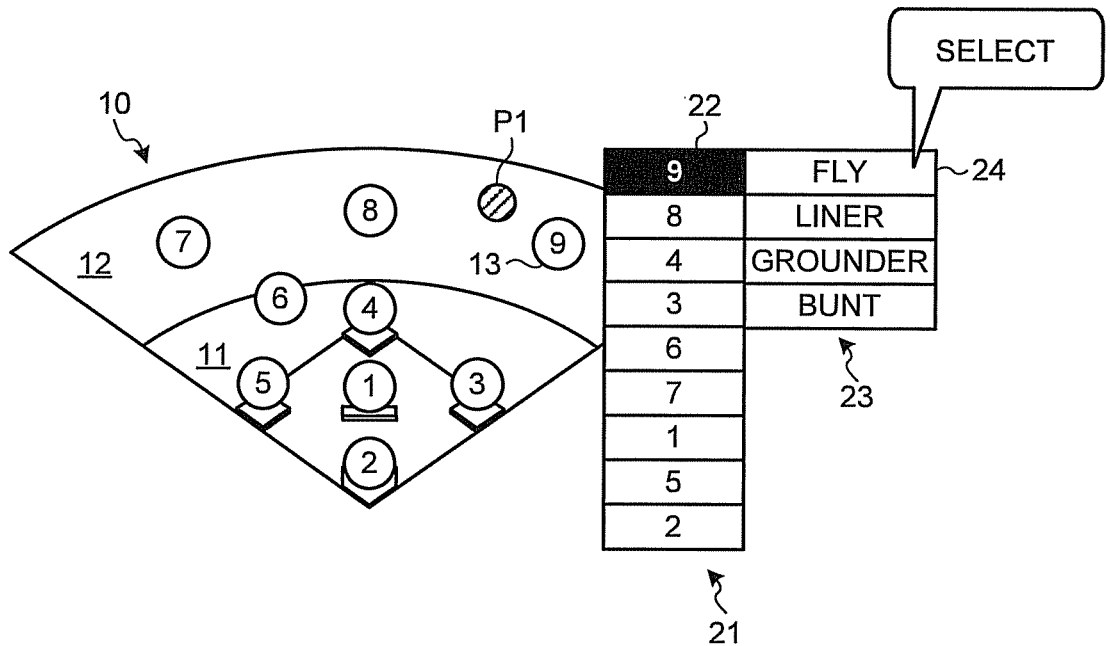
FIG. 4 is a third diagram for explaining some of example procedures for creating an electronic scorebook according to the first embodiment.

The determined batted ball type candidate order is input to the GUI image generation unit 111. The GUI image generation unit 111 generates an image of selection buttons for selecting the batted ball type, and arranges the selection buttons according to the batted ball type candidate order. The image of the arranged selection buttons is displayed as a batted ball type selection button group 23 in a region next to the catching fielder selection button group 21 on the display unit 140 as illustrated in FIG. 4. In this process, the GUI image generation unit 111 positions the batted ball type selection button group 23 in such a manner that a selection button 24 of the most likely batted ball type is next to the selection button 22 selected from the catching fielder selection button group 21. For example, in the example illustrated in FIG. 4, the batted ball type selection button group 23 is displayed in such a manner that the selection button 24 of 'fly' that is the most likely batted ball type is next to the selection button 22 of the selected right fielder '9', and the selection buttons of 'liner', 'grounder', and 'bunt' are arranged under the selection button 24 according to the batted ball type candidate order. The user selects and input the actual batted ball type to the displayed batted ball type selection button group 23 with use of the operation input unit 130. For example, in the example illustrated in FIG. 4, the selection button 24 of 'fly' is selected and input as the actual batted ball type. In this operation, since the distance from the selection button 22 to the batted ball type selection button group 23 on the screen is short, the operation time can be shortened and input can be performed more smoothly.

Figure 5:
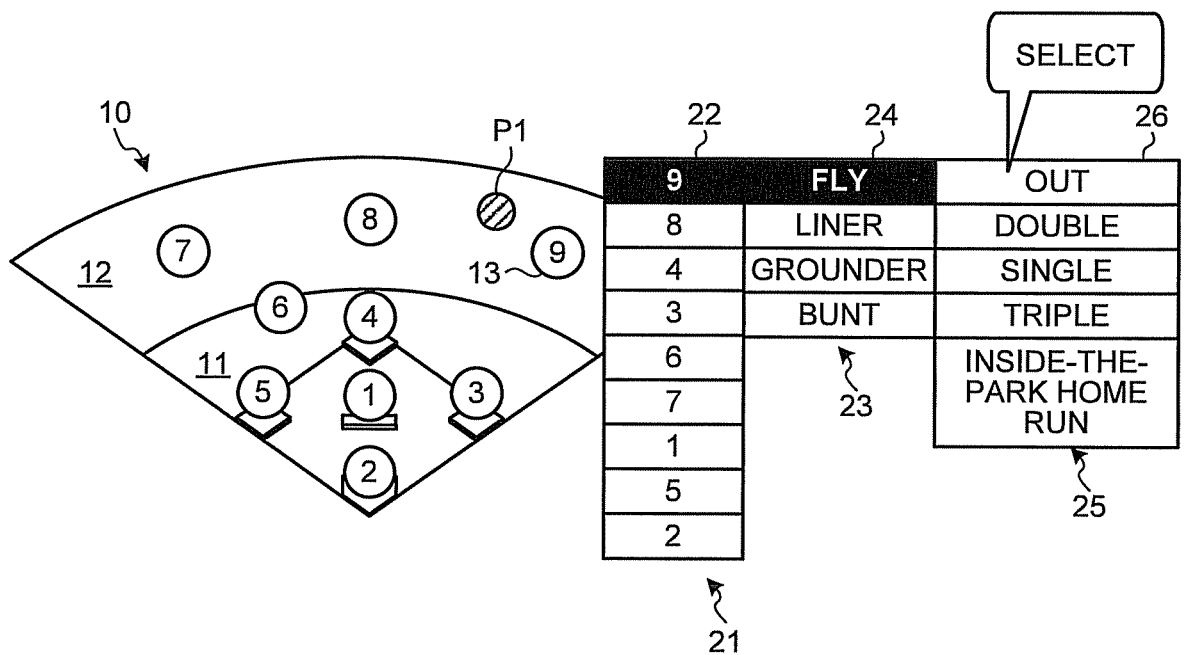
FIG. 5 is a fourth diagram for explaining some of example procedures for creating an electronic scorebook according to the first embodiment.

Information on the selected and input batted ball type is input to the input processing unit 112. The input processing unit 112 inputs the information on the selected and input batted ball type to the GUI image generation unit 111 and to the order determination unit 114. Similarly to the selection button 22 for the catching fielder, the GUI image generation unit 111 generates an image for highlighting the selection button 24 of the selected and input batted ball type, and updates the selection button 24 with the generated image as illustrated in FIG. 5.

The order determination unit 114 arranges batting results in descending order of possibility on the basis of the information on the predicted catch position 14, for example, to determine the order of batting result candidates. The batting result candidates may be read in advance from the storage unit 120, for example. In this description, five batting results, which are 'out', 'single', 'double', 'triple', and 'inside-the-park home run are presented as examples of the batting results. The information on the predicted catch position 14 used for determining the order in which the batting results are arranged may be the distance from the predicted catch position 14 to the first base on the field image 10, for example. Association between such information on the predicted catch position 14 and the batting results may also be read in advance from the storage unit 120, for example. In this case, the order determination unit 114 may determine the batting result candidate order on the basis of the information on the predicted catch position 14 and the association read from the storage unit 120. When the batting result candidate order is to be determined on the basis of combination of a plurality of pieces of information such as the catching fielder, the predicted catch position and the batted ball type, association between the combination and the batting result candidate order may be registered in advance in the storage unit 120. The combination of the plurality of pieces of information may be combination of two or more pieces of information selected from the predicted catch position 14 (or catch area), the catching fielder, fielders' running abilities (running speeds), identification information of the batter (or the batter's batting average or slugging percentage), the batter's running ability, the pitcher's pitch type, on-base conditions, the count, the number of outs, identification information of the stadium (or the area or the layout of the stadium), and the like, for example.

The determined batting result candidate order is input to the GUI image generation unit 111. Similarly to the batted ball type, the GUI image generation unit 111 generates an image of selection buttons for selecting the batting result, and arranges the selection buttons according to the batting result candidate order. The image of the arranged selection buttons is displayed as a batting result selection button group 25 in a region next to the batted ball type selection button group 23 on the display unit 140 as illustrated in FIG. 5. In this process, the GUI image generation unit 111 positions the batting result selection button group 25 in such a manner that a selection button 26 of the most likely batting result is next to the selection button 24 selected from the batted ball type selection button group 23. For example, in the example illustrated in FIG. 5, the batting result selection button group 25 is displayed in such a manner that the selection button 26 of 'out' that is the most likely batting result is next to the selection button 24 of the selected 'fly' and the selection buttons of 'double', 'single', 'triple', and 'inside-the-park home run' are arranged under the selection button 26 according to the batting result candidate order. The user selects and inputs the actual batting result to the displayed batting result selection button group 25 with use of the operation input unit 130. For example, in the example illustrated in FIG. 5, the selection button 26 of 'out' is selected and input as the actual batting result. In this operation, since the distance from the selection button 24 to the batting result selection button group 25 on the screen is short, the operation time can be shortened and input can be performed more smoothly.

After all pieces of information of the catching fielder, the batted ball type, and the batting result are selected and input as described above, the input information confirmation unit 115 confirms turn-at-bat information including these information data, and performs confirmation operation. Specifically, the input information confirmation unit 115 confirms the input turn-at-bat information, and stores the confirmed turn-at-bat information together with an ID (a turn-at-but identifier k, which will be described later) for identifying the turn-at-bat in the storage unit 120. In this process, the on-base conditions (including runners being safe or out), the count, the score, and the like may also contained in the turn-at-bat information and stored in the storage unit 120.

If the user wishes to correct the turn-at-bat information after the turn-at-bat information is confirmed, the user can perform operation to select a position other than the selection button groups displayed on the display unit 140, so that the operation is switched to a correction mode and returns to the state illustrated in FIG. 2, for example, and the user can perform correction operation starting from specification of the predicted catch position 14 again. Note that, instead of the position other than the selection button groups, a correction button (not illustrated) for inputting the correction operation may be displayed for similar operation.

Figure 6:
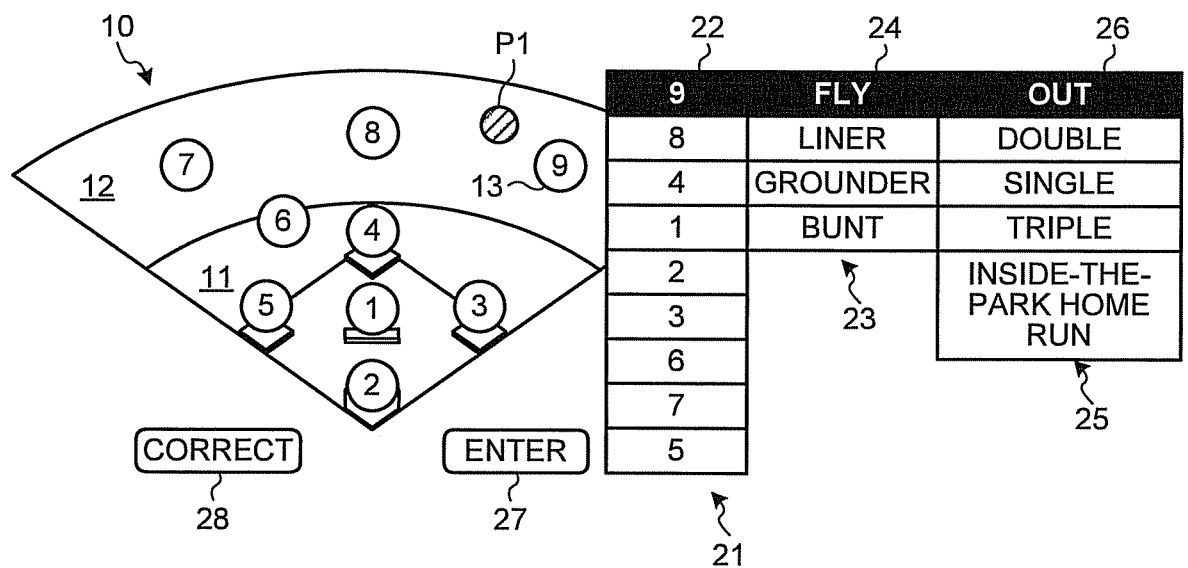
FIG. 6 is a fifth diagram for explaining some of example procedures for creating an electronic scorebook according to the first embodiment.

In addition, after pieces of information on the catching fielder, the batted ball type, and the batting result are selected and input, the GUI image generation unit 111 may display an enter button 27 for confirming the turn-at-bat information including these pieces of information and a correct button 28 for correcting the turn-at-bat information on the display unit 140 as illustrated in FIG. 6. If the correct button 28 is selected by the user, the operation returns to the state illustrated in FIG. 2, for example, and the operation can be performed again starting from specification of the predicted catch position 14. If the enter button 27 is selected, the input information confirmation unit 115 confirms the input turn-at-bat information and stores the confirmed turn-at-bat information together with the ID (the turn-at-bat identifier k, which will be described later) for identifying the turn-at-bat in the storage unit 120. In this process, the on-base conditions (including runners being safe or out), the count, the score, and the like may also contained in the turn-at-bat information and stored in the storage unit 120.

As a result of repeating the operation and procedures as described above, an electronic scorebook can be created and saved in the storage unit 120.

Furthermore, since the catching fielder selection button group 21, the batted ball type selection button group 23, and the batting result selection button group 25 are sequentially displayed adjacent to one another in the order of input, input can be made with a so-called single stroke. As a result, information can be input more quickly and a GUI that is easy to operate can be provided to the user. In this process, the position where the catching fielder selection button group 21 is displayed for the input predicted catch position 14 may be adjusted so that input with one stroke can also include from specification of the predicted catch position 14 to selection and input of the catching fielder.

Figure 7:
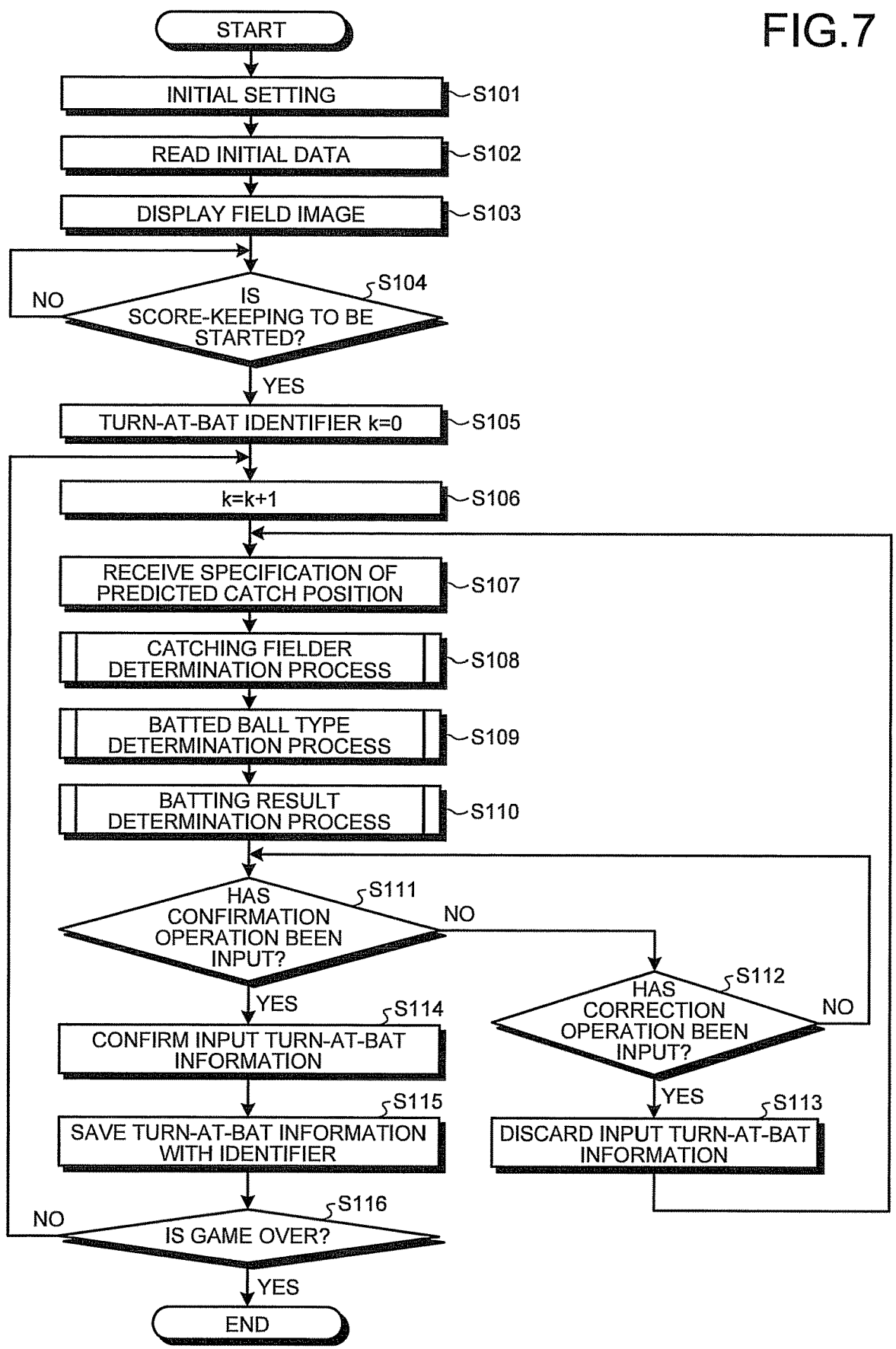
FIG. 7 is a flowchart illustrating example operation for creating an electronic scorebook according to the first embodiment.

Next, operation for generating an electronic scorebook of one game including the procedures as described above will be described below. FIG. 7 is a flowchart illustrating example operation for creating an electronic scorebook according to the first embodiment.

As illustrated in FIG. 7, when an application for creating an electronic scorebook according to the first embodiment is started and the operation is started, the processor 110 first performs an initial setting operation of inputting various pieces of information such as the stadium, the team names, starting members, and the like (step S101). Subsequently, the processor 110 reads various pieces of information such as a schematic view of the stadium, fielders' positions, fielding shifts, batted ball types, and batting results from the storage unit 120 on the basis of the initially set information (step S102).

Subsequently, the processor 110 uses the GUI image generation unit 111 to generate a field image 10 from the read schematic view of the stadium, places icons 13 of fielders on the basis of the likewise read fielders' positions and fielding shifts, and displays the generated field image 10 and the icons 13 on the display unit 140 (see FIG. 2) (step S103).

After the preparation for creating an electronic scorebook is completed as described above, the processor 110 waits until a score-keeping start instruction is input by the user (step S104; NO). When the user inputs an instruction to start keeping the score with use of the operation input unit 130, the processor 110 first resets the turn-at-bat identifier k to 0 (k=0) (step S105), and subsequently increments the turn-at-bat identifier k by 1 (k=k+1) (step S106). Note that the configuration may be such that fielding shifts of the fielders placed on the field image 10 can be changed at this timing or at subsequent appropriate timing.

Subsequently, the processor 110 receives specification of the predicted catch position 14 with use of the operation input unit 130 (step S107). Upon receiving the specification of the predicted catch position 14, the processor 110 sequentially performs a catching fielder determination process (step S108), a batted ball type determination process (step S109), and a batting result determination process (step S110). Details of the respective determination processes will be described later.

After the turn-at-bat information including pieces of information on the catching fielder, the batted ball type, and the batting result is determined as described above, the processor 110 determines whether or not confirmation operation has been performed (step S111). If it is determined that the confirmation operation has not been performed (step S111; NO), the processor 110 determines whether or not the correct button 28 has been selected and input (step S112). If it is determined that the correct button 28 has been selected and input (step S112; YES), the processor 110 discards the input turn-at-bat information (step S113), then returns to step S107, for example, and performs subsequent processes. If it is determined that the correct button 28 has not been selected (step S112; NO), the processor 110 returns to step S111, for example.

If it is determined in step S111 that the confirmation operation has been performed (step S111; YES), the processor 110 confirms the input turn-at-bat information (step S114), and saves the confirmed turn-at-bat information together with the turn-at-bat identifier k in the storage unit 120 (step S115). In this process, identification information for indicating that the turn-at-bat information is one piece of turn-at-bat information in a series of electronic scorebooks for respective games may also be saved in the storage unit 120.

Thereafter, the processor 110 determines whether or not an instruction to end the game has been given (step S116), for example. If it is determined that the instruction to end the game has not been given (step S116; NO), the processor 110 returns to step S106 and performs subsequent processes on the next turn-at-bat. If it is determined that the instruction to end the game has been instructed (step S116; YES), the processor 110 may terminate the present operation.

Figure 8:
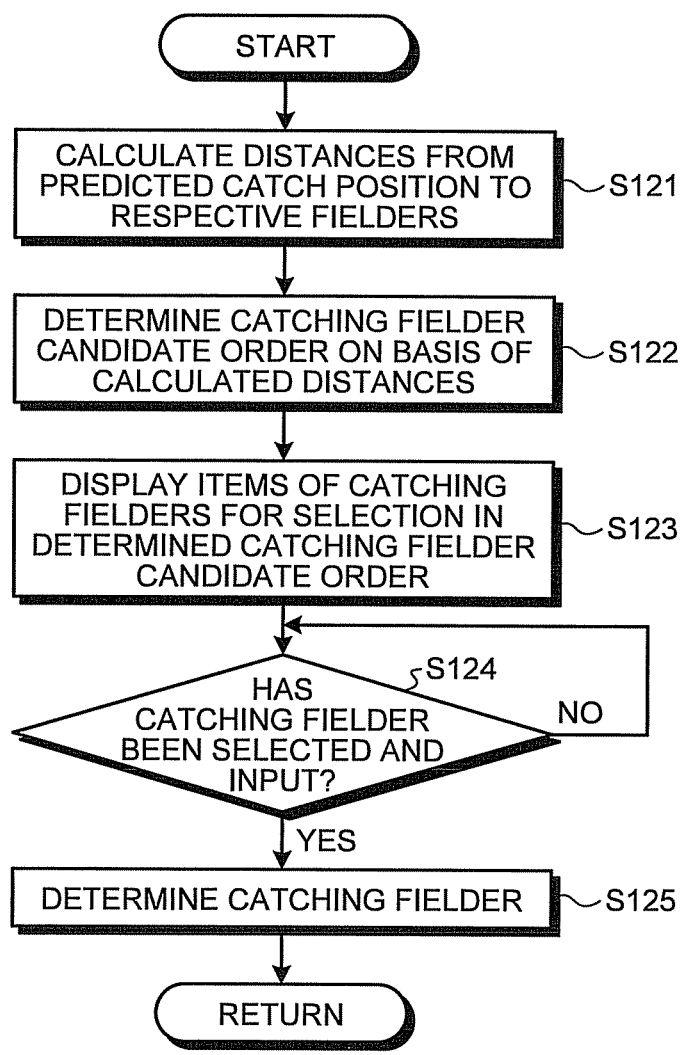
FIG. 8 is a flowchart illustrating an example of a catching fielder determination process according to the first embodiment.

Next, the catching fielder determination process presented in step S108 in FIG. 7 will be described with reference to FIG. 8. As illustrated in FIG. 8, in the catching fielder determination process S108, the distance calculation unit 113 first calculates the distances from the predicted catch position 14 to the respective fielders by using the field coordinates of the predicted catch position 14 input by the input processing unit 112 and the field coordinates of the respective fielders read from the storage unit 120 (step S121). The calculated distances of the respective fielders are input to the order determination unit 114.

The order determination unit 114 arranges all the fielders in descending order of possibility of catching on the basis of the input distances of the respective fielders to determine the order of catching fielder candidates (step S122). The determined catching fielder candidate order is input to the GUI image generation unit 111.

As described with reference to FIG. 3, the GUI image generation unit 111 generates the catching fielder selection button group 21 for selecting the catching fielder according to the catching fielder candidate order, and displays the generated catching fielder selection button group 21 on the display unit 140 (step S123). Subsequently, the processor 110 waits until a catching fielder is selected and input to the catching fielder selection button group 21 (step S124; NO).

When a catching fielder is selected and input to the catching fielder selection button group 21 (step S124; YES), the input processing unit 112 determines the selected and input catching fielder (step S125) and then returns to the operation illustrated in FIG. 7.

Figure 9:
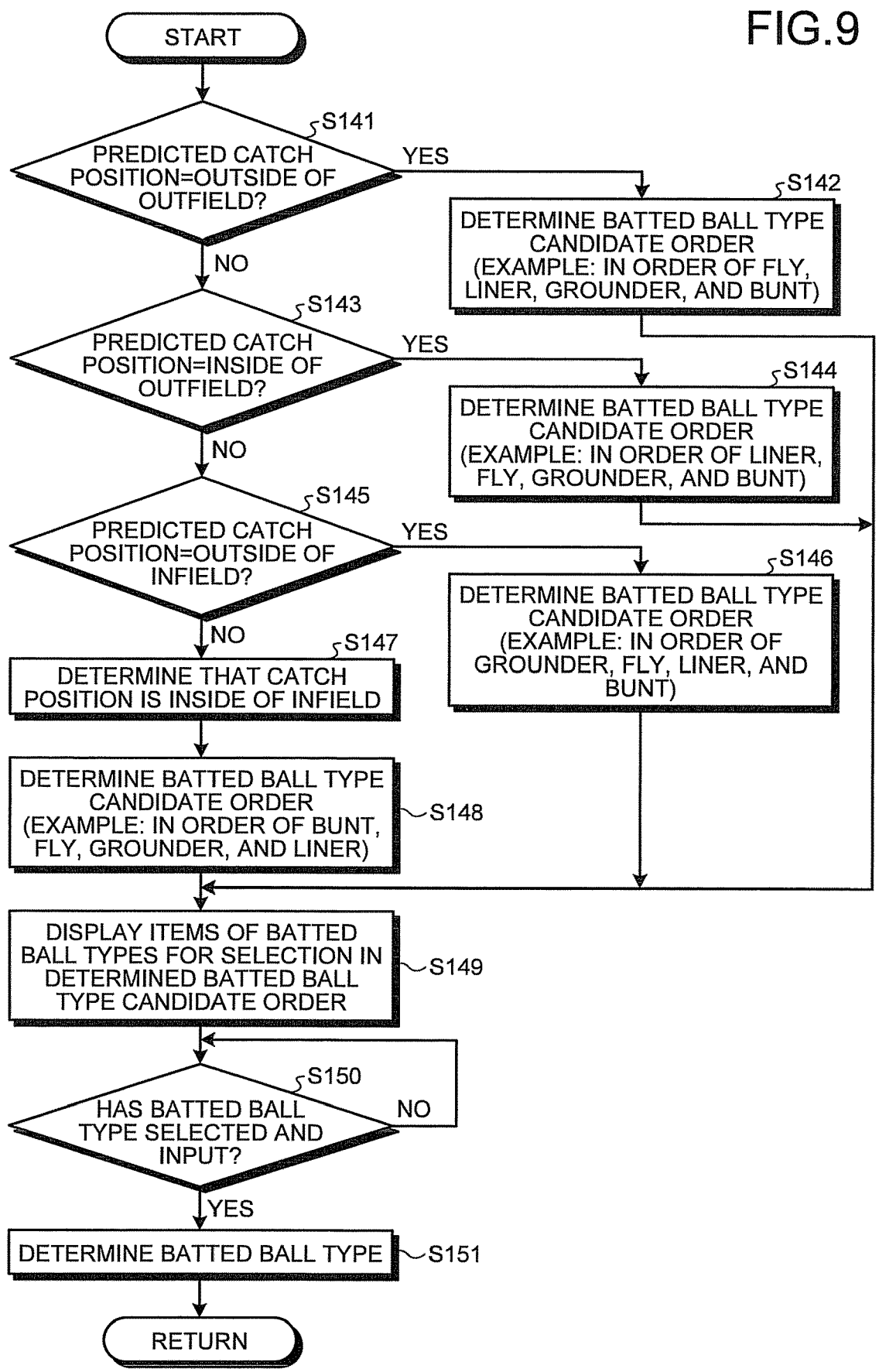
FIG. 9 is a flowchart illustrating an example of a batted ball type determination process according to the first embodiment.

Next, the batted ball type determination process presented in step S109 in FIG. 7 will be described with reference to FIG. 9. As illustrated in FIG. 9, in the batted ball type determination process S109, the order determination unit 114 first determines whether or not the input predicted catch position 14 is outside of the outfield 12 in the field image 10 (step S141). If it is determined that the predicted catch position 14 is outside of the outfield (step S141; YES), the order determination unit 114 determines the batted ball type candidate order to be the order of 'fly', 'liner', 'grounder', and 'bunt' on the basis of association read in advance from the storage unit 120, for example (step S142), and proceeds to step S149.

If it is determined that the predicted catch position 14 is not outside of the outfield (step S141; NO), the order determination unit 114 determines whether or not the predicted catch position 14 is inside of the outfield 12 in the field image 10 (step S143). If it is determined that the predicted catch position 14 is inside of the outfield (step S143; YES), the order determination unit 114 determines the batted ball type candidate order to be the order of 'liner', 'fly', 'grounder', and 'bunt' on the basis of the association read in advance from the storage unit 120, for example (step S144), and proceeds to step S149.

If it is determined that the predicted catch position 14 is not inside of the outfield (step S143; NO), the order determination unit 114 determines whether or not the predicted catch position 14 is outside of the infield 11 in the field image 10 (step S145). If it is determined that the predicted catch position 14 is outside of the infield (step S145; YES), the order determination unit 114 determines the batted ball type candidate order to be the order of 'grounder', 'fly', 'liner', and 'bunt' on the basis of association read in advance from the storage unit 120, for example (step S146), and proceeds to step S149.

If it is determined that the predicted catch position 14 is not outside of the infield (step S145; NO), the order determination unit 114 determines that the predicted catch position 14 is inside of the infield 11 in the field image 10 (step S147), determines the batted ball type candidate order to be the order of 'bunt', 'fly', 'grounder', and 'liner' on the basis of the association read in advance from the storage unit 120, for example (step S148), and proceeds to step S149.

In step S149, as described with reference to FIG. 4, the GUI image generation unit 111 generates the batted ball type selection button group 23 for selecting a batted ball type according to the batted ball type candidate order, and displays the generated batted ball type selection button group 23 on the display unit 140 (step S149).

Subsequently, the processor 110 waits until a batted ball type is selected and input to the batted ball type selection button group 23 (step S150; NO).

When a batted ball type is selected and input to the batted ball type selection button group 23 (step S150; YES), the input processing unit 112 determines the selected and input batted ball type (step S151) and then returns to the operation illustrated in FIG. 7.

Figure 10:
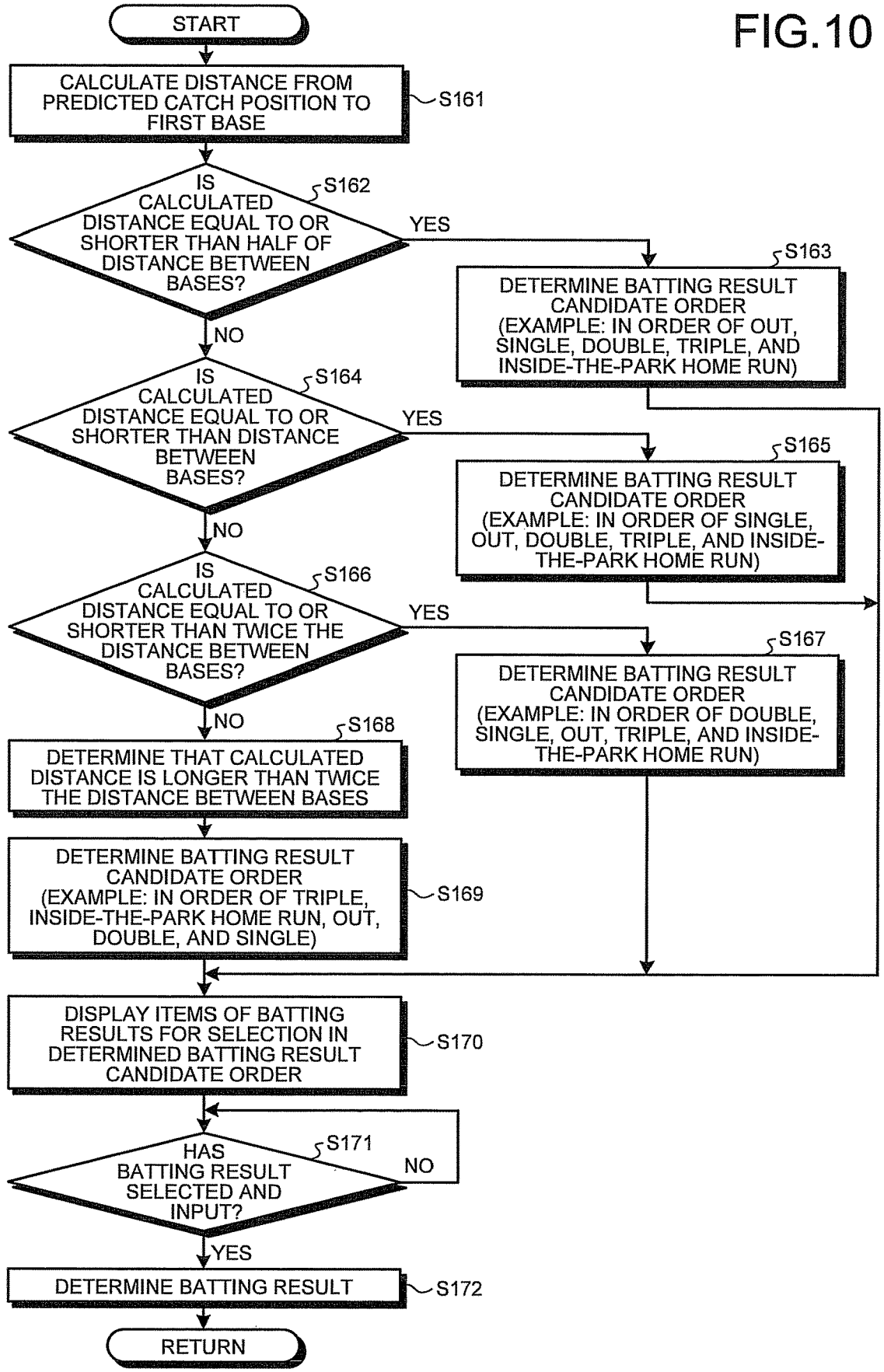
FIG. 10 is a flowchart illustrating an example of a batting result determination process according to the first embodiment.

Next, the batting result determination process presented in step S110 in FIG. 7 will be described with reference to FIG. 10. As illustrated in FIG. 10, in the batting result determination process S110, the distance calculation unit 113 first calculates the distance from the input predicted catch position 14 to the first base in the field image 10 (step S161). The calculated distance from the predicted catch position 14 to the first base is input to the order determination unit 114.

The order determination unit 114 determines whether or not the distance from the predicted catch position 14 to the first base is equal to or shorter than a half of the distance between bases (the distance from the home plate to the first base, for example) (step S162). If it is determined that the distance from the predicted catch position 14 to the first base is equal to or shorter than a half of the distance between bases (step S162; YES), the order determination unit 114 determines the batting result candidate order in the order of 'out', 'single', 'double', 'triple', and 'inside-the-park home run' on the basis of association read in advance from the storage unit 120, for example (step S163), and proceeds to step S170.

If it is determined that the distance from the predicted catch position 14 to the first base is not equal to or shorter than a half of the distance between bases (step S162; NO), the order determination unit 114 determines whether or not the distance from the predicted catch position 14 to the first base is equal to or shorter than the distance between bases (step S164). If it is determined that the distance from the predicted catch position 14 to the first base is equal to or shorter than the distance between bases (step S164; YES), the order determination unit 114 determines the batting result candidate order in the order of 'single', 'out', 'double', 'triple', and 'inside-the-park home run' on the basis of the association read in advance from the storage unit 120, for example (step S165), and proceeds to step S170.

If it is determined that the distance from the predicted catch position 14 to the first base is not equal to or shorter than the distance between bases (step S164; NO), the order determination unit 114 determines whether or not the distance from the predicted catch position 14 to the first base is equal to or shorter than twice the distance between bases (step S166). If it is determined that the distance from the predicted catch position 14 to the first base is equal to or shorter than twice the distance between bases (step S165; YES), the order determination unit 114 determines the batting result candidate order in the order of 'double', 'single', 'out', 'triple', and 'inside-the-park home run' on the basis of the association read in advance from the storage unit 120, for example (step S167), and proceeds to step S170.

If it is determined that the distance from the predicted catch position 14 to the first base is not equal to or shorter than twice the distance between bases (step S166; NO), the order determination unit 114 determines that the distance from the predicted catch position 14 to the first base is longer than twice the distance between bases (step S168), determines the batting result candidate order in the order of 'triple', 'inside-the-park home run', 'out', 'double', and 'single' on the basis of the association read in advance from the storage unit 120, for example (step S169), and proceeds to step S170.

In step S170, as described with reference to FIG. 5, the GUI image generation unit 111 generates the batting result selection button group 25 for selecting a batting result according to the batting result candidate order, and displays the generated batting result selection button group 25 on the display unit 140 (step S170). Subsequently, the processor 110 waits until a batting result is selected and input to the batting result selection button group 25 (step S171; NO).

When a batting result is selected and input to the batting result selection button group 25 (step S171; YES), the input processing unit 112 determines the selected and input batting result (step S172), and then returns to the operation illustrated in FIG. 7.

With the configuration and the operation as described above, according to the electronic scorebook creation device 100 according to the first embodiment, it is possible to start input without waiting for a ball to be actually caught by a fielder. As a result, input can be started more quickly in response to an actual batting. Furthermore, as a result of sequentially displaying the selection button groups displayed for inputting various pieces of information next to one another in the order of input, input can be made with a so-called single stroke. As a result, information can be input more quickly and a GUI that is easy to operate can be provided to the user.

Second Embodiment

Next, an electronic scorebook creation device, an electronic scorebook creation method, and a computer-readable recording medium according to a second embodiment will be described in detail with reference to the drawings.

The electronic scorebook creation device according to the second embodiment may have the same configuration as that of the electronic scorebook creation device 100 described with reference to FIG. 1, for example. However, example operation of the processor 110 in creating an electronic scorebook according to the second embodiment and some of example procedures for creating an electronic scorebook according to the second embodiment will be as follows.

FIGS. 11 to 15 are diagrams illustrating some of the example procedures for creating an electronic scorebook according to the second embodiment. In the second embodiment, similarly to the first embodiment, for creating an electronic scorebook, a field image 10 and icons 13 of fielders placed on the field image 10 are provided to the user via the display unit 140 (see FIG. 11, for example).

Figure 11:
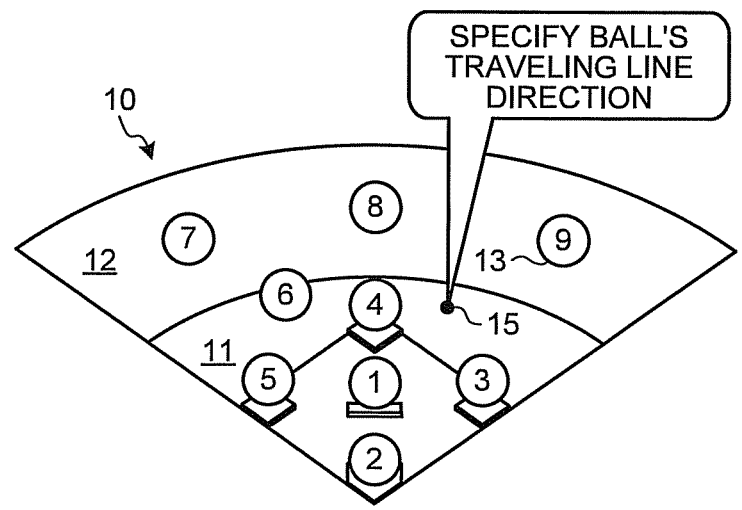
FIG. 11 is a first diagram for explaining some of example procedures for creating an electronic scorebook according to a second embodiment.

Subsequently, when a game is started and a batter in the batter's box has batted, the user specifies the direction 15 in which the batted ball travels (hereinafter referred to as the ball's traveling line direction) in the field image 10 with use of the operation input unit 130 as illustrated in FIG. 11. The specification of the ball's traveling line direction 15 may be performed in any of various methods such as a method of inputting points starting from the home plate and a method of dragging the operation input unit 130 in the direction of the ball's traveling line with respect to the field image 10. The ball's traveling line direction 15 specified in this manner may be an approximate direction of the ball's traveling line.

The specification of the ball's traveling line direction 15 input to the operation input unit 130 is input to the input processing unit 112. Information on the ball's traveling line direction 15 is coordinates or a vector in the screen coordinate system (information including coordinates of a start point and an end point). The input processing unit 112 thus converts the coordinates or vector in the screen coordinate system to a vector starting from the position of the home plate in the field coordinate system (information including coordinates of a start point and an end point, for example; hereinafter referred to as a ball's traveling line vector). Information (such as conversion equations and offsets between the coordinate systems) for conversion from coordinates or a vector in the screen coordinate system to the ball's traveling line vector may be stored in advance in the storage unit 120, for example.

The information on the ball's traveling line vector is input to the GUI image generation unit 111. The GUI image generation unit 111 generates an image D1 depicting the ball's traveling line vector input from the operation input unit 130 for the user. The generated image D1 is displayed on the field image 10 on the display unit 140 as illustrated in FIG. 12.

The information on the ball's traveling line vector is also input to the distance calculation unit 113. The distance calculation unit 113 also has field coordinates of the fielders loaded therein in advance from the storage unit 120. The distance calculation unit 113 calculates the distances from a line including the ball's traveling line vector to the respective fielders from the ball's traveling line vector and the field coordinates of the fielders. The distances calculated in this process may be the shortest distances from the respective fielders to the line including the ball's traveling line vector, for example. The calculated distances of the respective fielders are input to the order determination unit 114.

The order determination unit 114 arranges all the fielders on the basis of the input distances of the respective fielders to determine the order of catching fielder candidates. In this process, the catching fielder candidate order may be determined in such a manner that priority is given to infielders over outfielders when the ball's traveling line vector passes near the front of the infielders and otherwise priority is given to the outfielders, for example.

Figure 12:
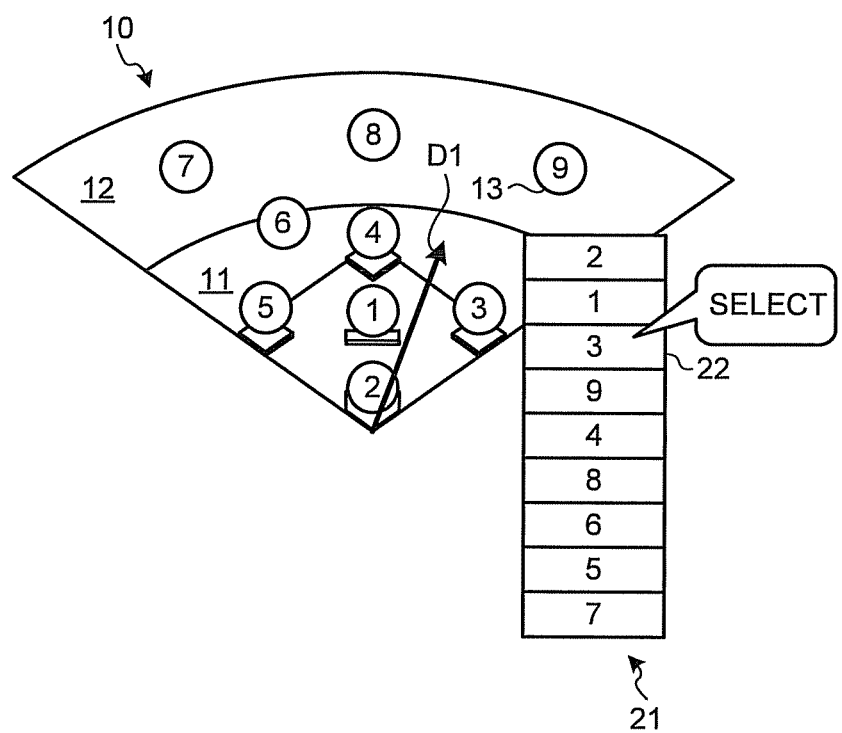
FIG. 12 is a second diagram for explaining some of example procedures for creating an electronic scorebook according to the second embodiment.
Figure 13:
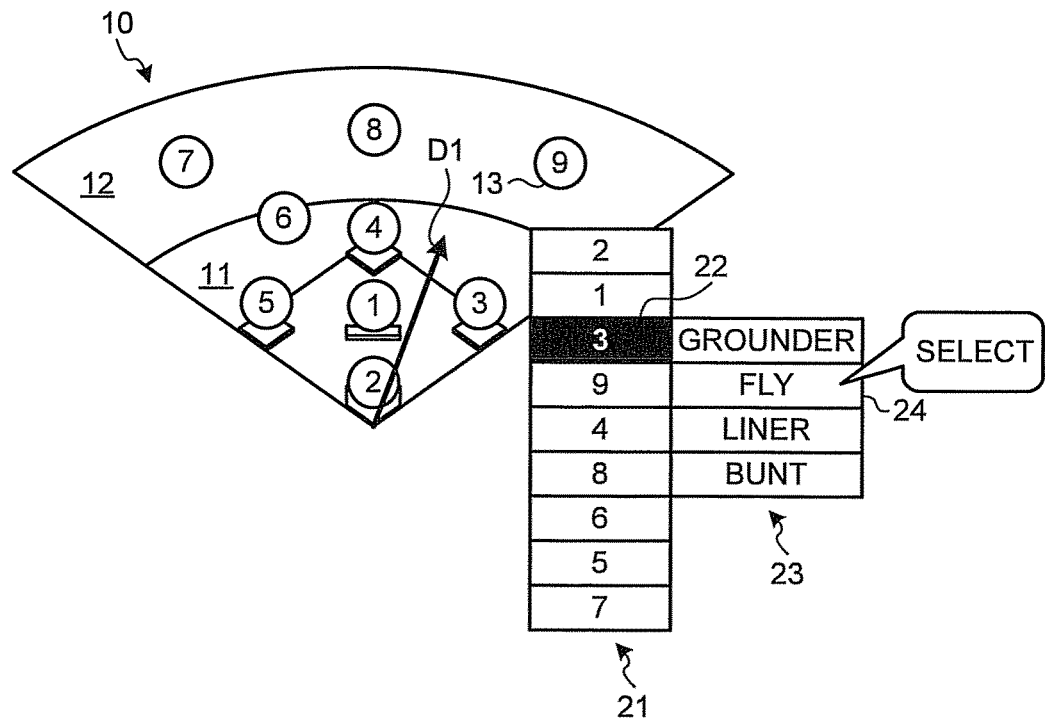
FIG. 13 is a third diagram for explaining some of example procedures for creating an electronic scorebook according to the second embodiment.
Figure 14:
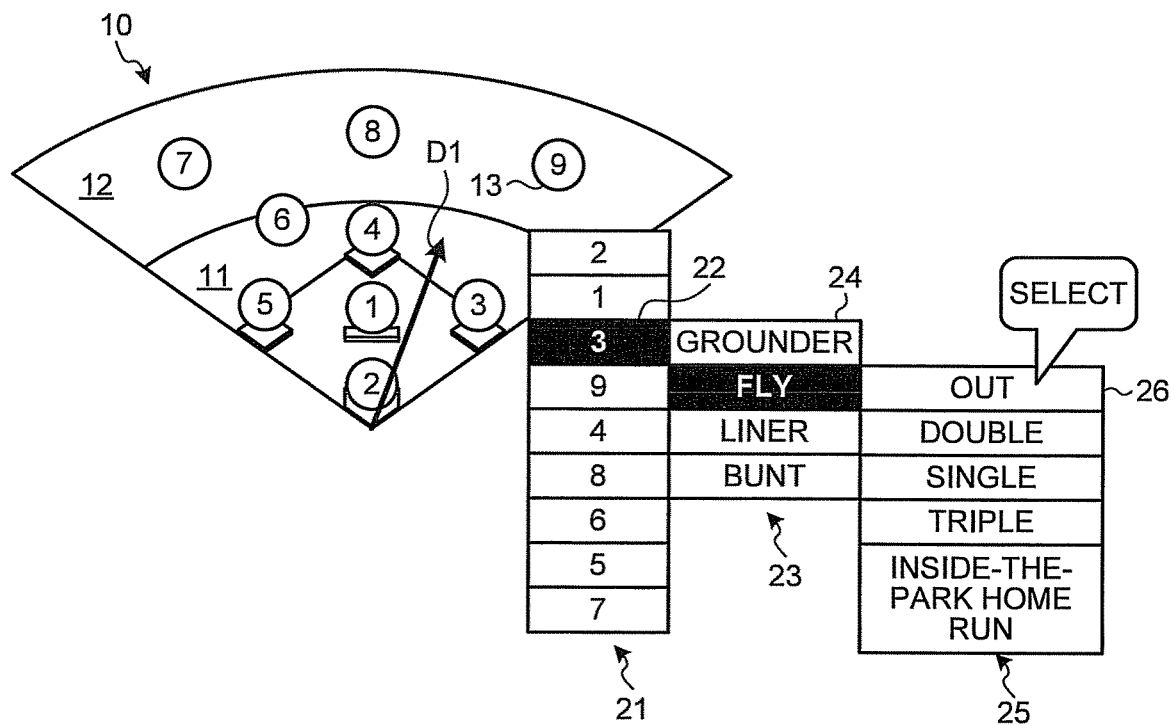
FIG. 14 is a fourth diagram for explaining some of example procedures for creating an electronic scorebook according to the second embodiment.

Subsequently, as illustrated in FIGS. 12 to 14, the catching fielder selection button group 21, the batted ball type selection button group 23, and the batting result selection button group 25 generated by the GUI image generation unit 111 are displayed sequentially on the display unit 140 similarly to the first embodiment.

After all pieces of information of the catching fielder, the batted ball type, and the batting result are selected and input with use of the catching fielder selection button group 21, the batted ball type selection button group 23, and the batting result selection button group 25 displayed as described above, the input information confirmation unit 115 confirms turn-at-bat information including these pieces of information, and performs confirmation operation. Specifically, the input information confirmation unit 115 confirms the input turn-at-bat information, and stores the confirmed turn-at-bat information together with an ID (a turn-at-but identifier k, which will be described later) for identifying the turn-at-bat in the storage unit 120. In this process, the on-base conditions (including runners being safe or out), the count, the score, and the like may also contained in the turn-at-bat information and stored in the storage unit 120.

If the user wishes to correct the turn-at-bat information after the turn-at-bat information is confirmed, the user can perform operation to select a position other than the selection button groups displayed on the display unit 140, so that the operation is switched to a correction mode and returns to the state illustrated in FIG. 2, for example, and the user can perform correction operation starting from specification of the predicted catch position 14 again. Note that, instead of the position other than the selection button groups, a correction button (not illustrated) for inputting the correction operation may be displayed for similar operation.

Figure 15:
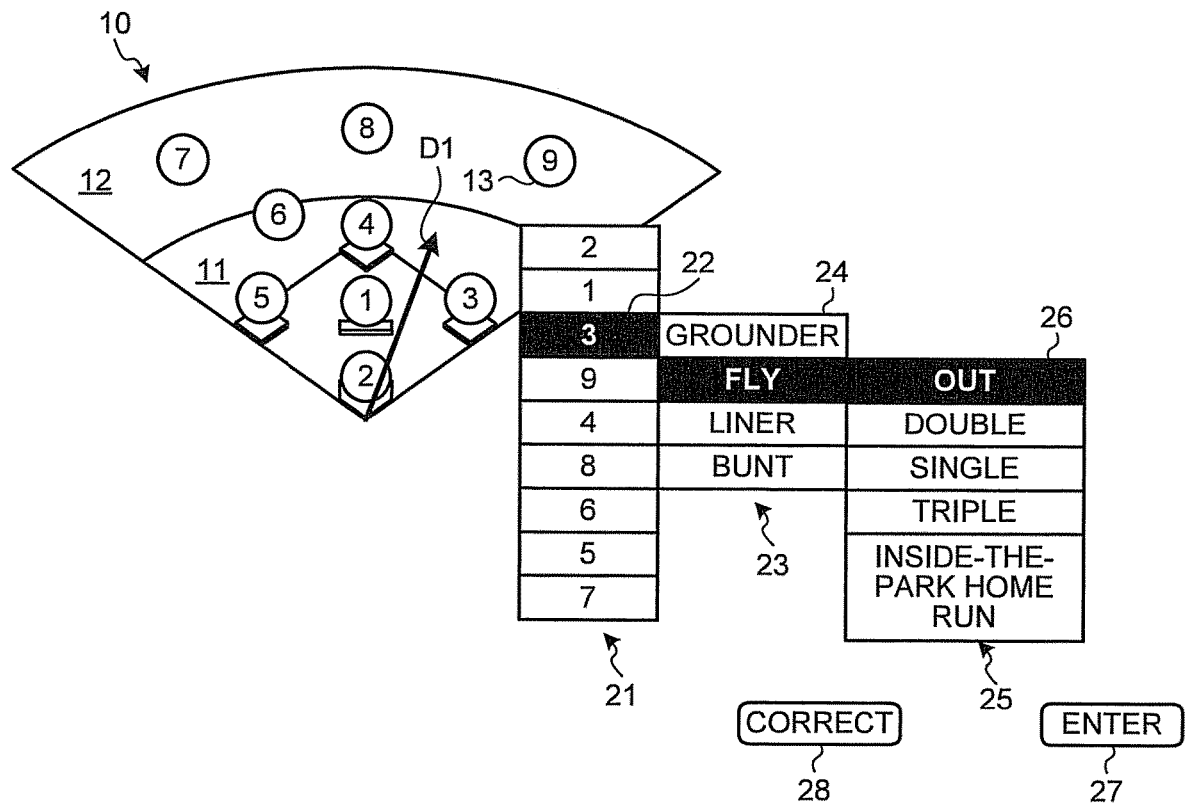
FIG. 15 is a fifth diagram for explaining some of example procedures for creating an electronic scorebook according to the second embodiment.

Furthermore, similarly to the description with reference to FIG. 6 in the first embodiment, the GUI image generation unit 111 may display the enter button 27 and the correct button 28 on the display unit 140 (see FIG. 15).

With the configuration and the operation as described above, it is possible to start input without waiting for a ball to be actually caught by a fielder similarly to the first embodiment. As a result, input can be started more quickly in response to an actual batting. Furthermore, as a result of sequentially displaying the selection button groups displayed for inputting various pieces of information next to one another in the order of input, input can be made with a so-called single stroke. As a result, the pieces of information can be input more quickly and a GUI that is easy to operate can be provided to the user. Since other configurations, operations, procedures, and effects are similar to those in the first embodiment, detailed description thereof will not be repeated herein.

Furthermore, in the second embodiment, a ball's traveling line vector including information (field coordinates) on an end point, for example, may be used instead of the ball's traveling line direction 15. In this case, when the user has predicted that the batted ball will reach an outfielder according to the user's visual observation, outfielders may be displayed higher in the candidates than infielders as a result of the user's operation of selecting the end point of the ball's traveling line vector within an outfield defensive range. Alternatively, when the user has predicted that the batted ball will not go out of the infield according to the user's visual observation, infielders may be displayed higher in the candidates than outfielders as a result of operation of selecting the end point of the ball's traveling line vector within an infield defensive range. Since the user can make determination from the catching fielder candidate order that is more feasible as a result of the arrangement in the catching fielder candidate order on the basis of the user's prediction, on a rough range of the leading end of the ball's traveling line vector in this manner, input to a scorebook can be performed more smoothly.

Third Embodiment

Next, an electronic scorebook creation device, an electronic scorebook creation method, and a computer-readable recording medium according to a third embodiment will be described in detail with reference to the drawings.

The electronic scorebook creation device according to the third embodiment may have the same configuration as that of the electronic scorebook creation device 100 described with reference to FIG. 1, for example. However, example operation of the processor 110 in creating the electronic scorebook according to the third embodiment and some of example procedures for creating the electronic scorebook according to the third embodiment will be as follows.

FIGS. 16 to 19 are diagrams illustrating some of the example procedures for creating the electronic scorebook according to the third embodiment. In the third embodiment as well, similarly to the first embodiment, for creating the electronic scorebook, a field image 10 is provided to the user via the display unit 140 (see FIG. 16, for example). The fielders placed on the field image 10, however, are selection buttons 16 for selecting a catching fielder.

Figure 16:
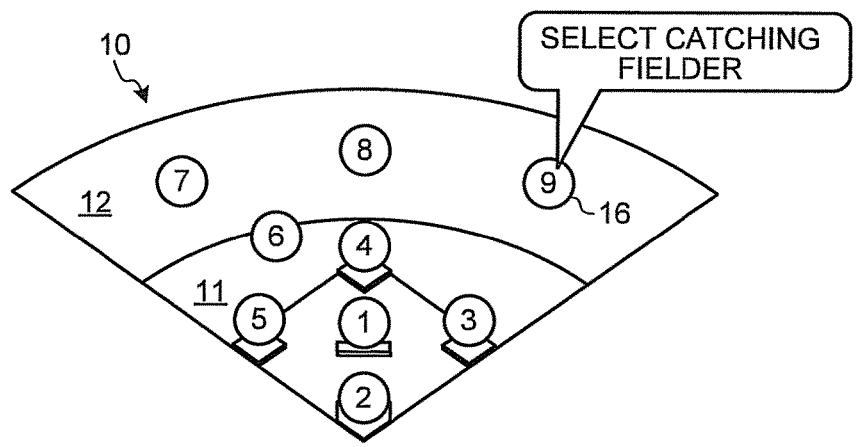
FIG. 16 is a first diagram for explaining some of example procedures for creating an electronic scorebook according to a third embodiment.
Figure 17:
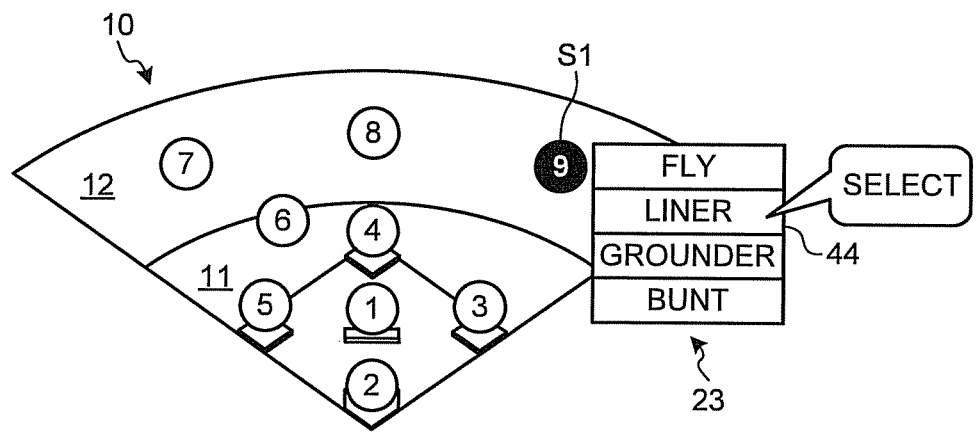
FIG. 17 is a second diagram for explaining some of example procedures for creating an electronic scorebook according to the third embodiment.
Figure 18:
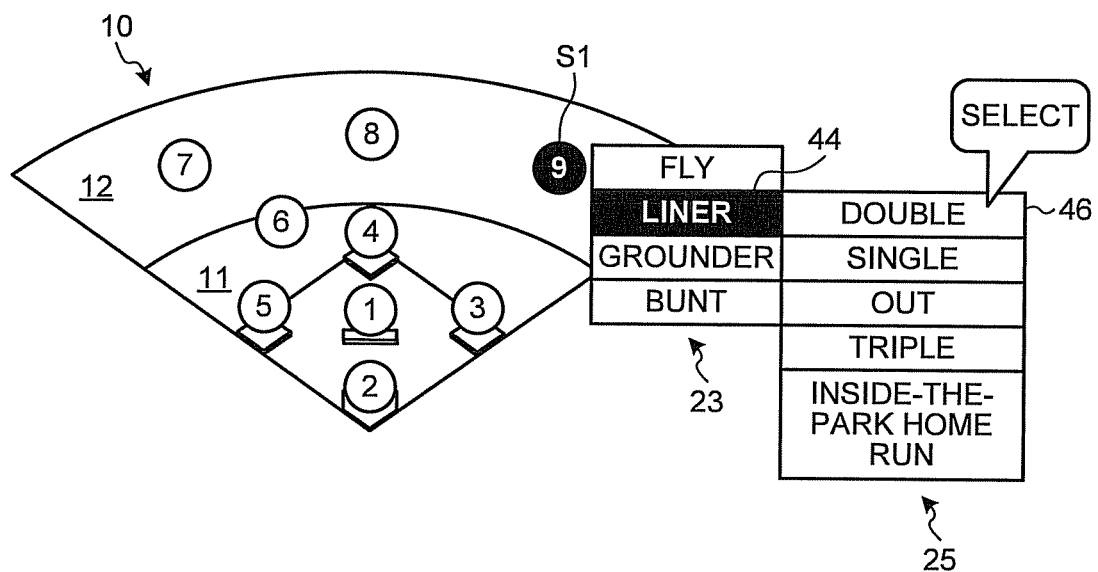
FIG. 18 is a third diagram for explaining some of example procedures for creating an electronic scorebook according to the third embodiment.
Figure 19:
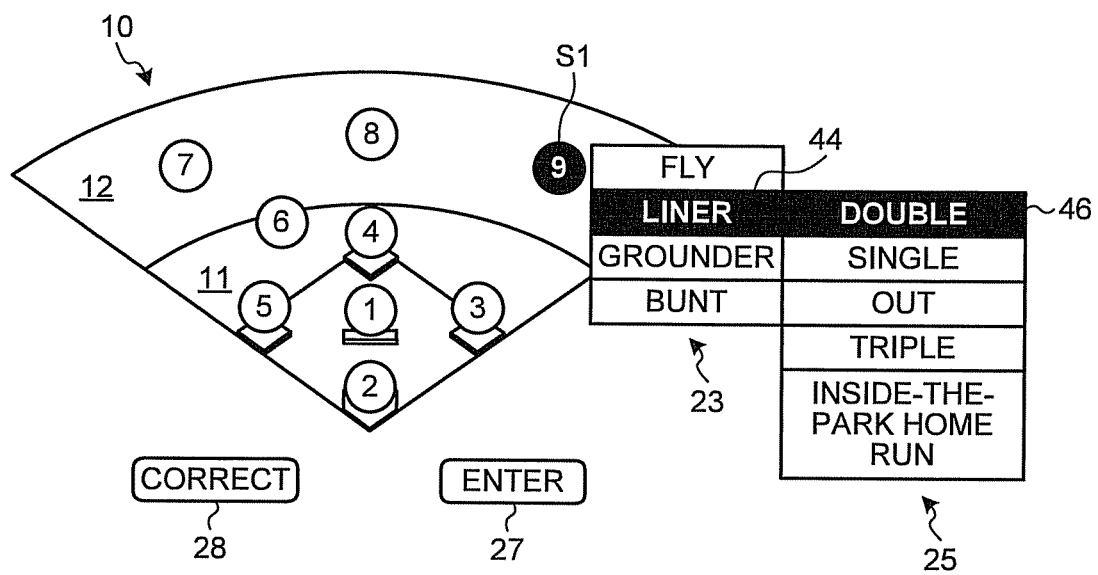
FIG. 19 is a fourth diagram for explaining some of example procedures for creating an electronic scorebook according to the third embodiment.

Subsequently, when a game is started and a batter in the batter's box has batted, the user selects and inputs a selection button 16 of the fielder who has actually caught the ball with use of the operation input unit 130 as illustrated in FIG. 16. Subsequently, as illustrated in FIGS. 17 and 18, the batted ball type selection button group 23 and the batting result selection button group 25 generated by the GUI image generation unit 111 are displayed sequentially on the display unit 140 similarly to the first or second embodiment.

After all pieces of information of the catching fielder, the batted ball type, and the batting result are selected and input with use of the catching fielder selection button group 21, the batted ball type selection button group 23, and the batting result selection button group 25 displayed as described above, the input information confirmation unit 115 confirms turn-at-bat information including these pieces of information, and performs confirmation operation. Specifically, the input information confirmation unit 115 confirms the input turn-at-bat information, and stores the confirmed turn-at-bat information together with an ID (a turn-at-but identifier k, which will be described above) for identifying the turn-at-bat in the storage unit 120. In this process, the on-base conditions (including runners being safe or out), the count, the score, and the like may also contained in the turn-at-bat information and stored in the storage unit 120.

If the user wishes to correct the turn-at-bat information after the turn-at-bat information is confirmed, the user can perform operation to select a position other than the selection button groups displayed on the display unit 140, so that the operation is switched to a correction mode and returns to the state illustrated in FIG. 2, for example, and the user can perform correction operation starting from specification of the predicted catch position 14 again. Note that, instead of the position other than the selection button groups, a correction button (not illustrated) for inputting the correction operation may be displayed for similar operation.

Furthermore, similarly to the description with reference to FIG. 6 in the first embodiment, the GUI image generation unit 111 may display the enter button 27 and the correct button 28 on the display unit 140 (see FIG. 15).

With the configuration and the operation as described above, as a result of sequentially displaying the selection button groups displayed for inputting various pieces of information next to one another in the order of input, input can be made with a so-called single stroke similarly to the first embodiment. As a result, the pieces of information can be input more quickly and a GUI that is easy to operate can be provided to the user. Since other configurations, operations, procedures, and effects are similar to those in the first embodiment, detailed description thereof will not be repeated herein.

According to the present invention, an electronic scorebook creation device, an electronic scorebook creation method, and a program therefor capable of starting input more quickly in response to an actual batting can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic scorebook creation device comprising
   a display unit comprising a screen;
   an operation input unit configured to receive operation input via the screen; and a processor configured to create an electronic scorebook according to the operation input, wherein
the processor is configured to:
display a field image comprising position information of multiple fielders on the screen,
receive the operation input via the field image, wherein the operation input determines a ball's traveling line vector on the field image,
calculate, for each fielder of the multiple fielders on the field image, the shortest distance from each position of the fielder on the field image to a line including the ball's traveling line vector input via the operation input unit;
determine a catching fielder candidate order in which the fielders are arranged on a basis of the length of distance calculated from the each fielder position to the ball's traveling line vector,
display on the screen a catching fielder selection button group that displays information on the fielders arranged according to the catching fielder candidate order,
receive selection of a catching fielder input via the catching fielder selection button group,
determine a batted ball type candidate order in which batted ball type candidates are arranged,
display on the screen a batted ball type selection button group that displays the batted ball type candidates arranged in the batted ball type candidate order,
receive selection of a batted ball type input via the batted ball type selection button group,
determine a batting result candidate order in which batting result candidates are arranged,
display on the screen a batting result selection button group that displays the batting result candidates arranged according to the batting result candidate order,
receive selection of a batting result input via the batting result selection button group, and
create the electronic scorebook on a basis of information on the received catching fielder, batted ball type, and batting result.

2. The electronic scorebook creation device according to claim 1, wherein the processor is configured to:
display the batted ball type selection button group at a position adjacent to a selection button of the catching fielder selected from the catching fielder selection button group, and
display the batting result selection button group at a position adjacent to a selection button of the batted ball type selected from the batted ball type selection button group.

3. The electronic scorebook creation device according to claim 1, further comprising a storage unit configured to store turn-at-bat information specifying a catching fielder, a batted ball type, and a batting result, wherein
in response to receipt of confirmation input that confirms the catching fielder, the batted ball type, and the batting result, the processor stores the catching fielder, the batted ball type, and the batting result as a set of turn-at-bat information in the storage unit.

4. An electronic scorebook creation method using an electronic scorebook creation device including a display unit having a screen, an operation input unit configured to receive operation input via the screen, and a processor configured to create an electronic scorebook according to the operation input, the electronic scorebook creation method comprising:
displaying a field image containing position information of multiple fielders on the screen;
receiving the operation input via the field image, wherein the operation input determines a ball's traveling line vector on the field image;
calculating, for each fielder of the multiple fielders on the field image, the shortest distance from each position of the fielder on the field image to a line including the ball's traveling line vector input via the operation input unit;
determining a catching fielder candidate order in which the fielders are arranged on a basis of the length of distance calculated from the each fielder position to the ball's traveling line vector;
displaying on the screen a catching fielder selection button group in which information on the fielders is arranged according to the catching fielder candidate order;
receiving selection of a catching fielder input via the catching fielder selection button group;
determining a batted ball type candidate order in which batted ball type candidates are arranged;
displaying on the screen a batted ball type selection button group in which the batted ball type candidates are arranged in the batted ball type candidate order;
receiving selection of a batted ball type input via the batted ball type selection button group;
determining a batting result candidate order in which batting result candidates are arranged;
displaying on the screen a batting result selection button group in which the batting result candidates are arranged according to the batting result candidate order;
receiving selection of a batting result input via the batting result selection button group; and
creating the electronic scorebook based on information on the received catching fielder, batted ball type, and batting result.

5. A non-transitory computer-readable recording medium that therein stores a computer program causing an information processing device to function, the information processing device being connected to a display unit having a screen and an operation input unit configured to receive operation input via the screen, the information processing device being configured to create an electronic scorebook according to operation input by the operation input unit, the computer program causing the information processing device to execute:
displaying a field image containing position information of multiple fielders on the screen;
receiving the operation input via the field image, wherein the operation input determines a ball's traveling line vector on the field image;
calculating, for each fielder of the multiple fielders on the field image, the shortest distance from each position of the fielder on the field image to a line including the ball's traveling line vector input via the operation input unit;
determining a catching fielder candidate order whereby the fielders are arranged based on the length of distance calculated from the each fielder position to the ball's traveling line vector;
displaying on the screen a catching fielder selection button group that renders information on the fielders arranged according to the catching fielder candidate order;

receiving selection of a catching fielder input via the catching fielder selection button group;

determining a batted ball type candidate order in which batted ball type candidates are arranged;

displaying on the screen a batted ball type selection button group that renders the batted ball type candidates arranged in the batted ball type candidate order;

receiving selection of a batted ball type input via the batted ball type selection button group;

determining a batting result candidate order in which batting result candidates are arranged;

displaying on the screen a batting result selection button group that renders the batting result candidates arranged according to the batting result candidate order;

receiving selection of a batting result input via the batting result selection button group; and creating the electronic scorebook based on information on the received catching fielder, batted ball type, and batting result.

* * * * *